United States Patent
Simon

[11] Patent Number: 5,915,823
[45] Date of Patent: Jun. 29, 1999

[54] CENTRAL SOURCE LIGHT DISTRIBUTION SYSTEM AND COMPONENTS FOR MAINTAINING BEAM CONTINUITY TO ADJUSTABLY POSITIONABLE REMOTE ILLUMINATION DIRECTORS

[76] Inventor: Jerome H. Simon, 70 Sumner St., Newton Centre, Mass. 02159

[21] Appl. No.: 08/740,224

[22] Filed: Oct. 25, 1996

[51] Int. Cl.⁶ .................. F21S 3/00; F21V 21/30
[52] U.S. Cl. ................ 362/32; 362/147; 362/282; 362/322; 362/328; 362/268
[58] Field of Search .............. 362/32, 282, 283, 362/284, 346, 277, 297, 281, 319, 322, 324, 268, 323, 300, 307, 327, 328, 329, 147, 150, 148

[56] References Cited

U.S. PATENT DOCUMENTS

| | | | |
|---|---|---|---|
| 4,933,813 | 6/1990 | Berger | 362/2 |
| 5,126,923 | 6/1992 | Hall, II | 362/322 |
| 5,130,908 | 7/1992 | Simon | 362/150 |
| 5,276,592 | 1/1994 | Henkes | 362/61 |

*Primary Examiner*—Thomas M. Sember
*Attorney, Agent, or Firm*—Perkins, Smith & Cohen, LLP; Jerry Cohen; Harvey Kaye

[57] ABSTRACT

A light distribution system for distributing beams at remote locations, light beams from a quasi point source includes means for collimating light from the source into a radial beam or beams, conveyance means carrying collimated beams to remote illumination directors for directing light from the light distribution system to a volume to be illuminated. Light loss due to changing the system from a first configuration, i.e. set of spatial location spatial locations of illumination directors, to a second configuration is substantially eliminated. Means are provided to manipulate light beams to control their diversion and continuity in response to movements from changing from the first configuration to the second.

32 Claims, 14 Drawing Sheets

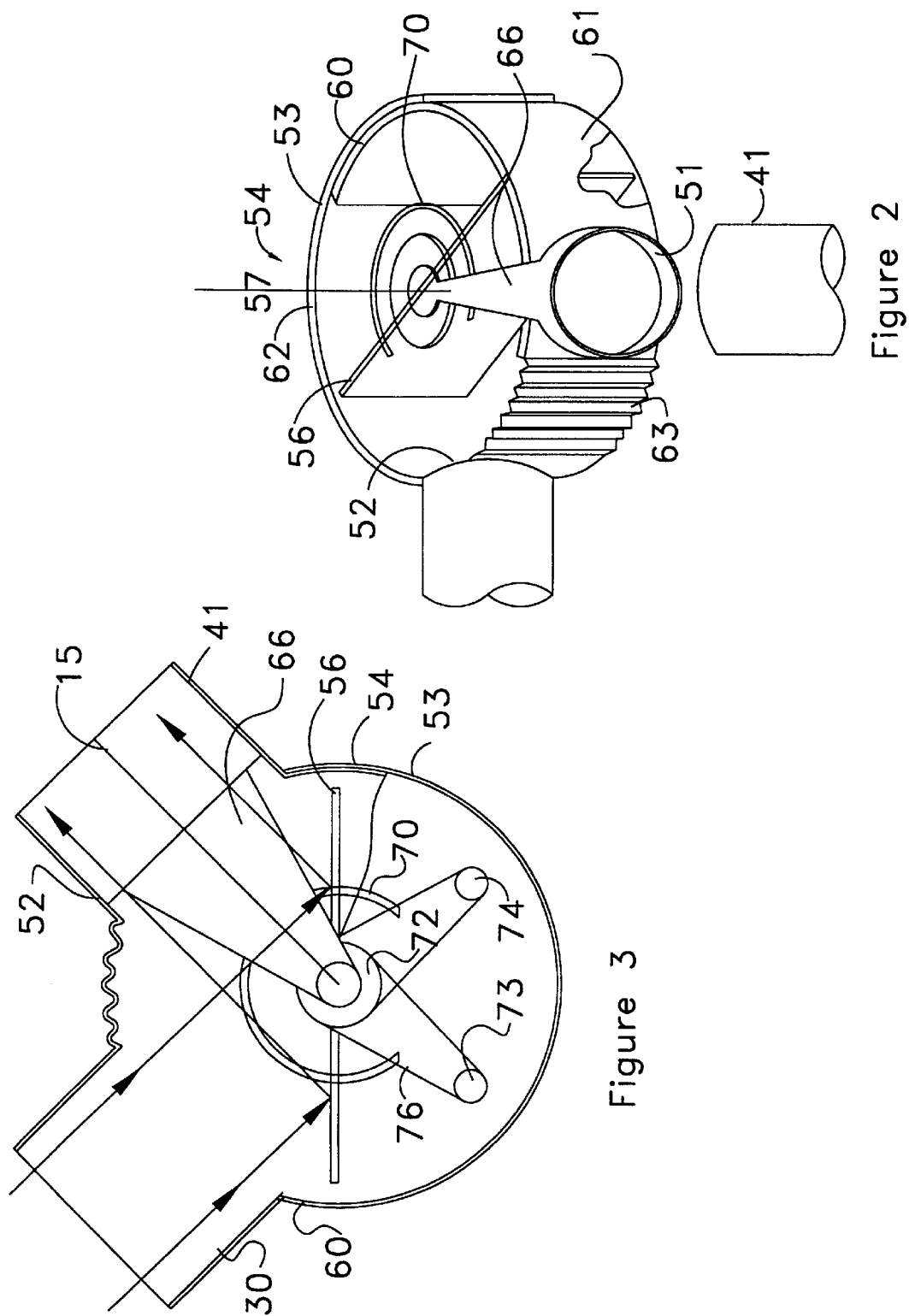

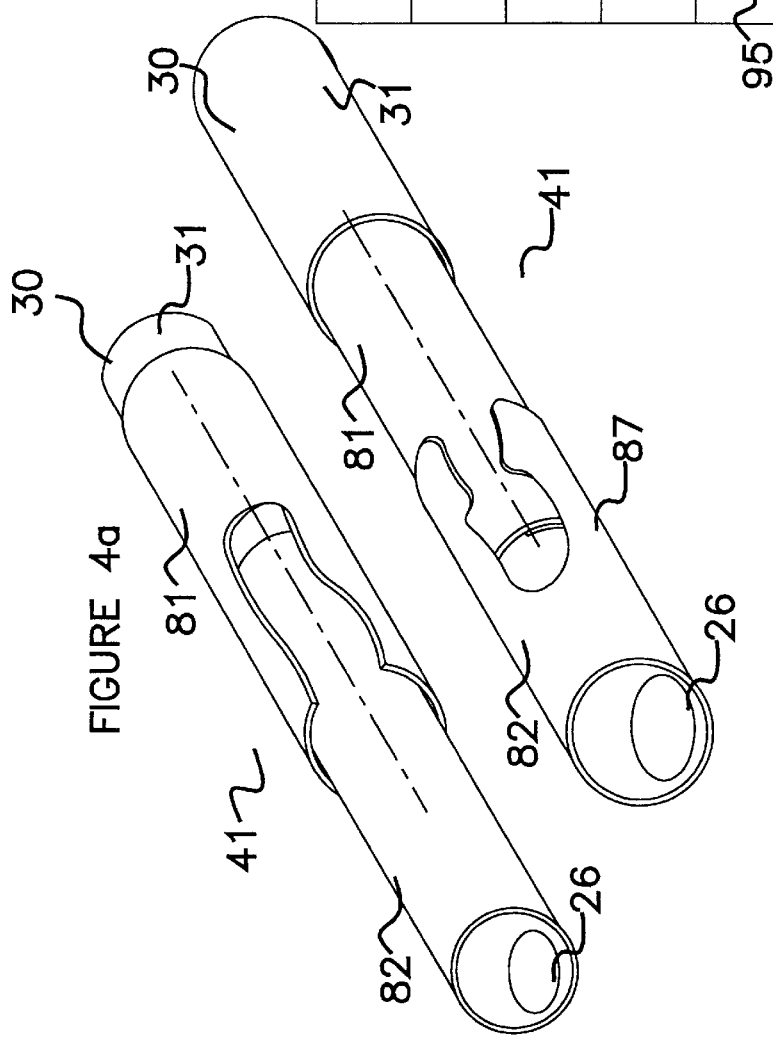
FIGURE 4a
FIGURE 4b
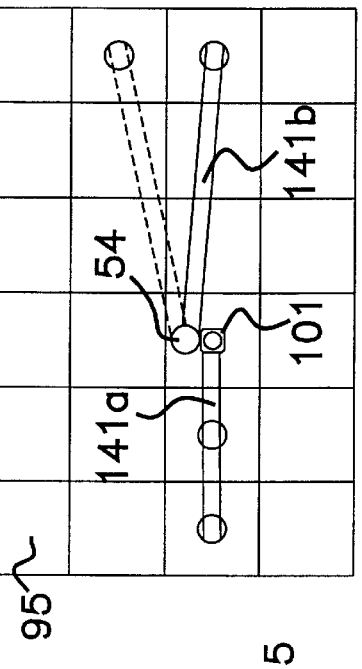
FIGURE 5

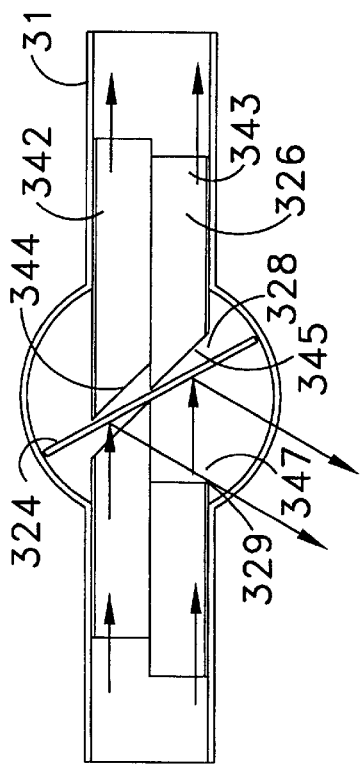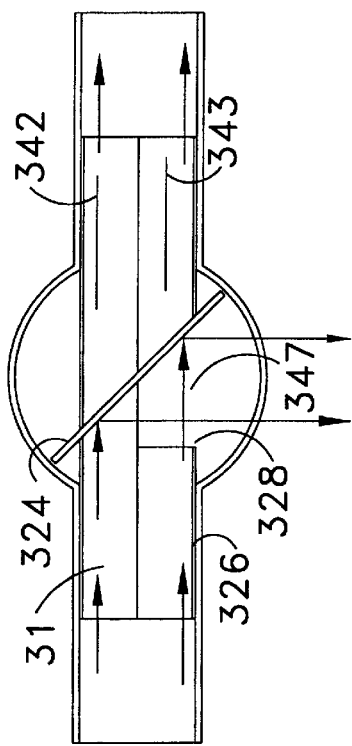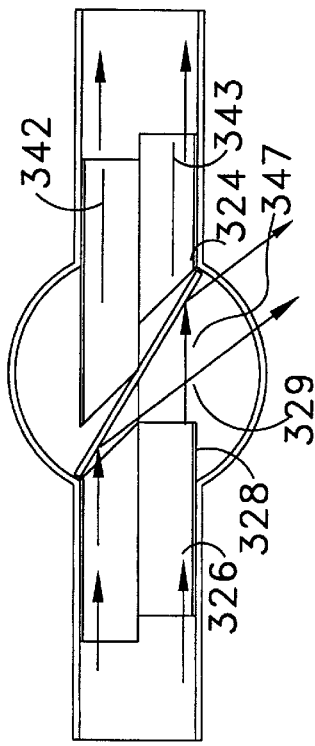

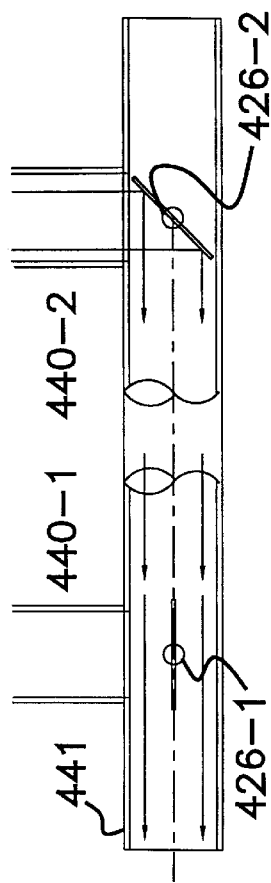
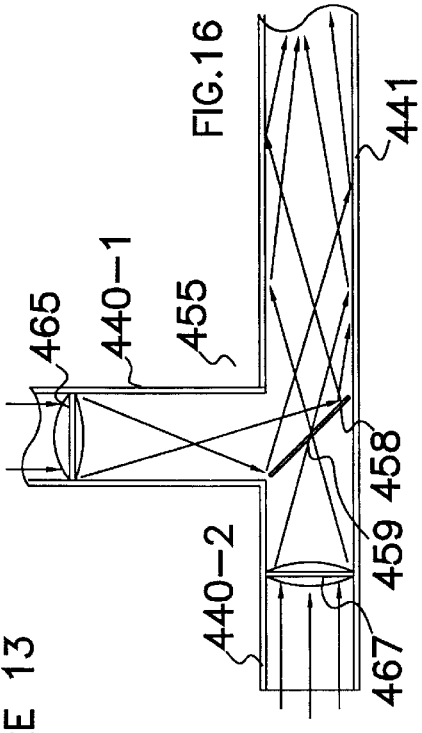
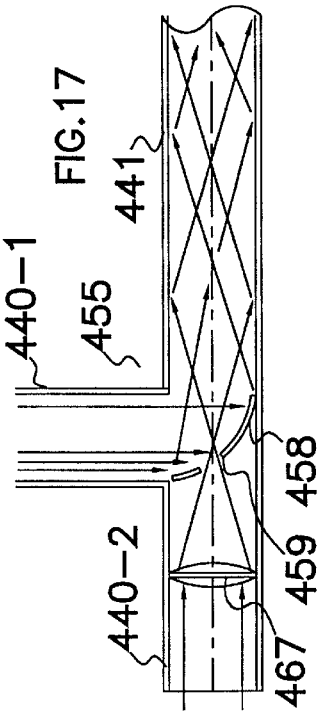
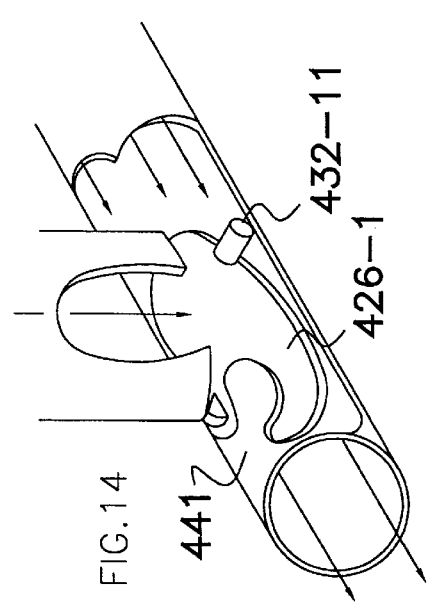
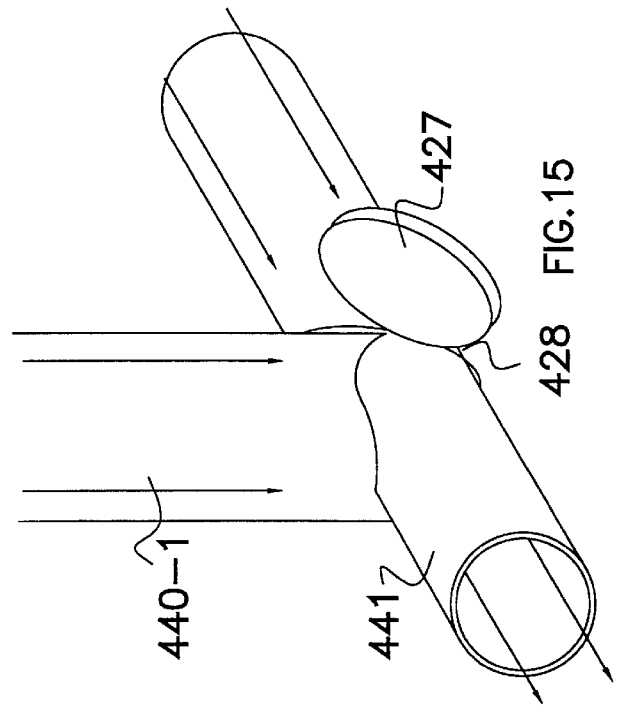

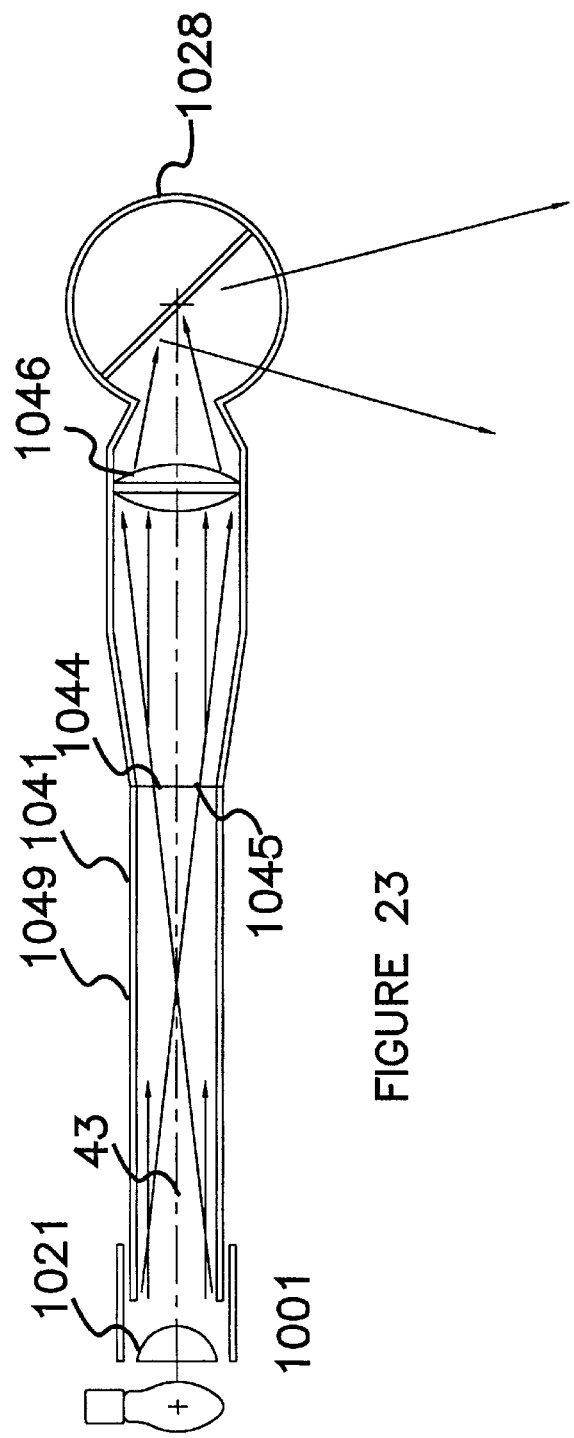
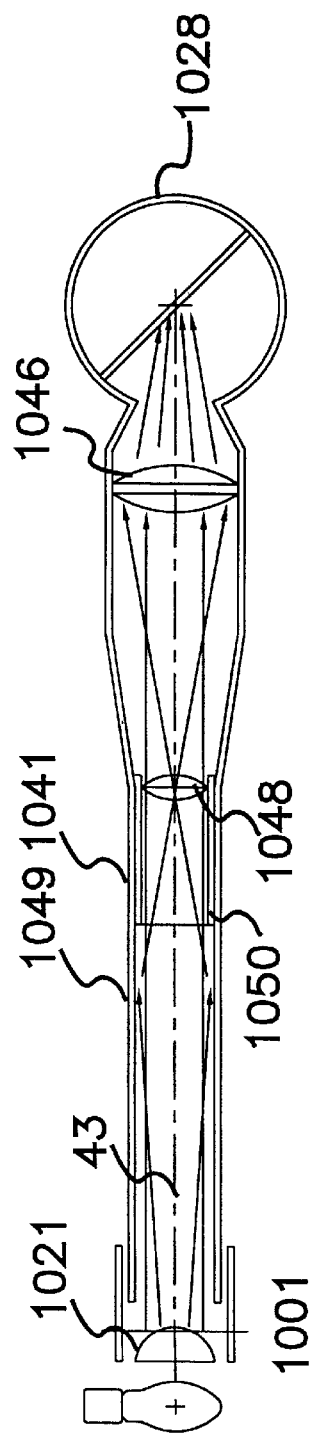
FIGURE 23
FIGURE 24

CENTRAL SOURCE LIGHT DISTRIBUTION SYSTEM AND COMPONENTS FOR MAINTAINING BEAM CONTINUITY TO ADJUSTABLY POSITIONABLE REMOTE ILLUMINATION DIRECTORS

BACKGROUND OF THE INVENTION

The present invention relates to a light distribution system, and components of the system for maintaining beam integrity and continuity, wherein a plurality of beams are each directed from the system by illumination directors, each remote from a source and disposed in a system configuration, and more particularly to a system in which system configuration, i.e. a set of spatial positions of illumination directors, may be changed while maintaining beam integrity and continuity.

As used on the present context, a radial light distribution system comprises a geometric, multidirectional collimator for surrounding a quasi point source. Collimation means surround the quasi point source for providing radial light beams. The radial beams pass through respective conveyance means to directing means. The conveyance means may comprise tubes or walls surrounding a beam, a defined open space or solid transmissive means. The directing means directs light away from the system to a space to be illuminated. Each directing means is remote from the collimation optics and source. The directing means are, in effect, non-wired light sources for room illumination. The beams thus directed leave the system through exit means. For purposes of the present description, the term "illumination director" refers to means which direct light beams away from the light distribution system to achieve illumination of, for example, a point, space or volume. An illumination director may comprise a directing means and its corresponding exit means.

A particularly successful and efficient example is illustrated in my U.S. Pat. No. 5,130,908 entitled Architectural Member Comprising Illumination System. My Provisional Application 60/005,621 filed Oct. 19, 1995 also provides for a multiple beam projection lighting system. The patent and the provisional application are commonly owned with the present application, and their disclosures are incorporated herein by reference.

Concepts and examples of radial collimation of light, from a quasi point source and distribution of light are presented in my commonly owned patent application Ser. No. 08/201,466 filed Feb. 25, 1994 entitled Architectural Lighting Distributed from Contained Radial Light, the disclosure of which is incorporated herein by reference. A quasi point source is provided and radiation from the source is divided in to separate radial paths. Conveyance means, which may comprise either solid, hollow or empty paths, carry light to remote directing means and through exit means to direct light away from the system in order to illuminate selected areas. In this manner, a system with many exit means and one source can replace prior art systems needing many sources. Expense in terms of wiring, source maintenance and energy consumption is greatly reduced by a distribution system.

Further, my commonly owned, copending patent application Ser. No. 08/610,303, the disclosure of which is also incorporated herein by reference, discloses a method and apparatus of controlling beam divergence in a system that provides a fixed lighting configuration.

While this embodiment has been successful for light distribution in which distributing means are fixed in an architectural member, it is highly desirable to provide a system in which the length of conveyance means may be changed and in which providing a directing means with the capacity to direct beams in any of a plurality of selectable positions. This enables one distribution system to be used to illuminate one set of objects or spaces in a room configured for one sort of display. When illumination requirements are reconfigured, the light distribution means can also be reconfigured. Reconfiguration is achieved by changing the spatial relationship of each illumination director with respect to the source and the collimation optics.

Successful reconfiguration, i.e. reconfiguration in which light loss between the source and the exit means is substantially eliminated, can not be provided simply by lengthening various components or simply revolving them about an axis fixed with respect to the source. Such arbitrary adjustments do not take in to account maintaining the integrity of a directed radial beam. Maintaining integrity includes maintaining the shape of the directed radial beam, i.e. its cross section. It is necessary to maintain continuity of the beam, e.g. as by minimizing beam divergence due or distortion to mechanical adjustment of a system in adjusting from one configuration to a next configuration. Increasing divergence can cause additional bounces off walls in conveyance means. Commonly, light is lost on each bounce. It is desirable to minimize light loss. Other mechanical adjustment, e.g. angular displacement of directing means from a first position, may affect the light transmission in other ways. Consequently, opportunities for light loss abound.

An adjustable system provides opportunities to formulate lighting standards to meet particular illumination requirements in a given room or other space. In the present description, lighting standard refers to a standard way of using a light system of a particular type to suit a standard requirement. For example, one particular type of lighting system is track lighting. One standard requirement is illumination of a vertical wall. The lighting standard in this system comprises placing a track parallel to the wall at a distance of two feet and providing a plurality of spot lights on the track.

Additionally it is desirable construct a system of the type described in a manner in which light from two or more sources may be combined. One source may be sunlight, further enhancing energy efficiency of the present invention.

SUMMARY OF THE INVENTION

It is therefore a general object of the present invention to provide an adjustable and versatile system for directing radially distributed light beams in any of a number of selected configurations for lighting an architectural space efficiently from at least a single source in which beam integrity is maintained.

It is also general object of the present invention to provide a system of the type described in which beam integrity, shape and continuity is maintained.

It is a more specific object of the present invention in one form to provide components for maintaining beam integrity and continuity of light from a quasi point source, which components are each also useful in a system of the type described.

It is another object of the present invention to provide a light distribution system of the type described in which light losses between a source and an exit means are minimized.

It is more specific object of the present invention to provide a light distribution system of the type described in which means are provided for limiting dispersion of a beam within conveyance means.

It is also a particular object of the present invention to provide a light distribution system of the type described in which components operate together to maintain a cross section of a directed beam.

It is a further specific object of the present invention to provide a system of the type described in which means are provided for coordinating the positioning of light directing components in correspondence with each configuration such that light loss between the source and the exit means is substantially eliminated.

It is also an object of the present invention in one form to provide for a predetermined relative motion between exit means and a directing means for maintaining light transmission efficiency.

It is an object of the present invention in another form to provide a light distribution system of the type described in which beam mixing is provided, whereby light sources may be combined, e.g. natural light with artificial light or two artificial light sources, and in which beam integrity is maintained.

It is also an object of the present invention to provide a light distribution system of the type described which, in another form, may utilize a plurality of exit means in one radial path.

It is a further object of the present invention to provide an adjustable system for which new lighting standards may be defined for particular illumination requirements.

It is yet another object of the present invention to provide a system of the type described which provides for projection of an image from a remote light distribution system.

Briefly stated, in accordance with the present invention, there is provided a condensing means for surrounding a source, preferably a quasi point source, providing collimated radial beams projected from the source. Each beam is conveyed by a conveyance means to directing means. Manipulation means cooperating with each conveyance means reflect, refract or transmit directly each beam to directing means. Generally, the manipulation means are in the optical path within the conveyance means. The directing means are included in an illumination director which directs light away from the system through exit means. Distance of the conveyance means of a selected path or paths to directing means is adjustable, as is angular displacement of the light beam from the original radial direction to define a selected configuration. Means are provided for coordinating the positioning of light directing components in correspondence with a configuration such beam integrity and continuity of the conveyed beams are maintained. Consequently, light loss between the source and the exit means due to change in configuration is substantially eliminated. Particular components are provided for use in collimation, conveyance and directing means to provide for continuity and integrity of the beam substantially irrespective of distance between the quasi point source and the illumination director.

BRIEF DESCRIPTION OF THE DRAWINGS

The means by which the foregoing objects and features of invention are achieved are pointed out with particularity in the claims forming the concluding portion of the specification. The invention may be further understood by reference to the following drawings taken in connection with the following description.

Of the drawings:

FIG. 2 is an axonometric illustration of reflecting components and their housing in a portion of FIG. 1;

FIG. 3 is a cross sectional view of FIG. 2 illustrating means for relatively positioning a reflecting mirror within a coupling means with respect to disposition of an arm coupled to receive light directed from a central quasi point source in the radial direction;

FIGS. 4a and 4b are illustrations of telescoping arms used in the system of FIG. 5;

FIG. 5 illustrates changes in configuration in systems by variation of length of collimating optics, for example by employing telescoping arms, and change by varying angular displacement of the transmitted beam to its original radial direction;

FIGS. 10, 11 and 12 are each an illustration of the directing means in each of a number of angular positions and exit apertures each having a respective corresponding size to minimize the aperture while transmitting the whole beam;

FIG. 13 is an illustration of means for selecting one of a plurality of light sources provided to an arm;

FIGS. 14 and 15 each illustrate alternative means for selecting a source for inclusion in the apparatus of FIG. 13;

FIGS. 16 and 17 are embodiments either which could be used in place of the embodiments of FIGS. 14 and 15 so that the apparatus of FIG. 13 will combine light from two different sources;

FIG. 23 is a cross sectional elevation of one arm of a system in which beam cross section and divergence from the condensing means is repeatedly reflected to the end of the conveyance means so that the beam divergence characteristics are substantially the same at the end of the conveyance means as they are when first leaving the collimation means; and FIG. 24 is a cross sectional elevation of an embodiment similar to that of FIG. 23, but in which tertiary optics are provided.

DESCRIPTION OF THE PREFERRED EMBODIMENTS

The present invention comprises a radial light distribution system adjustable from one configuration to another in which beam integrity and continuity are maintained as well as efficiency of the system. This can be accomplished mechanically by manipulating light beams in paths in correspondence to a change in configuration. Change in configuration may comprise a change in translation in a lineal direction of an illumination director (28 described below), angular displacement of an arm carrying the illumination director or combinations thereof. Forms of manipulation include changing angular displacement of a light beam with respect to its original radial direction or controlling divergence of the beam.

Figure 1:
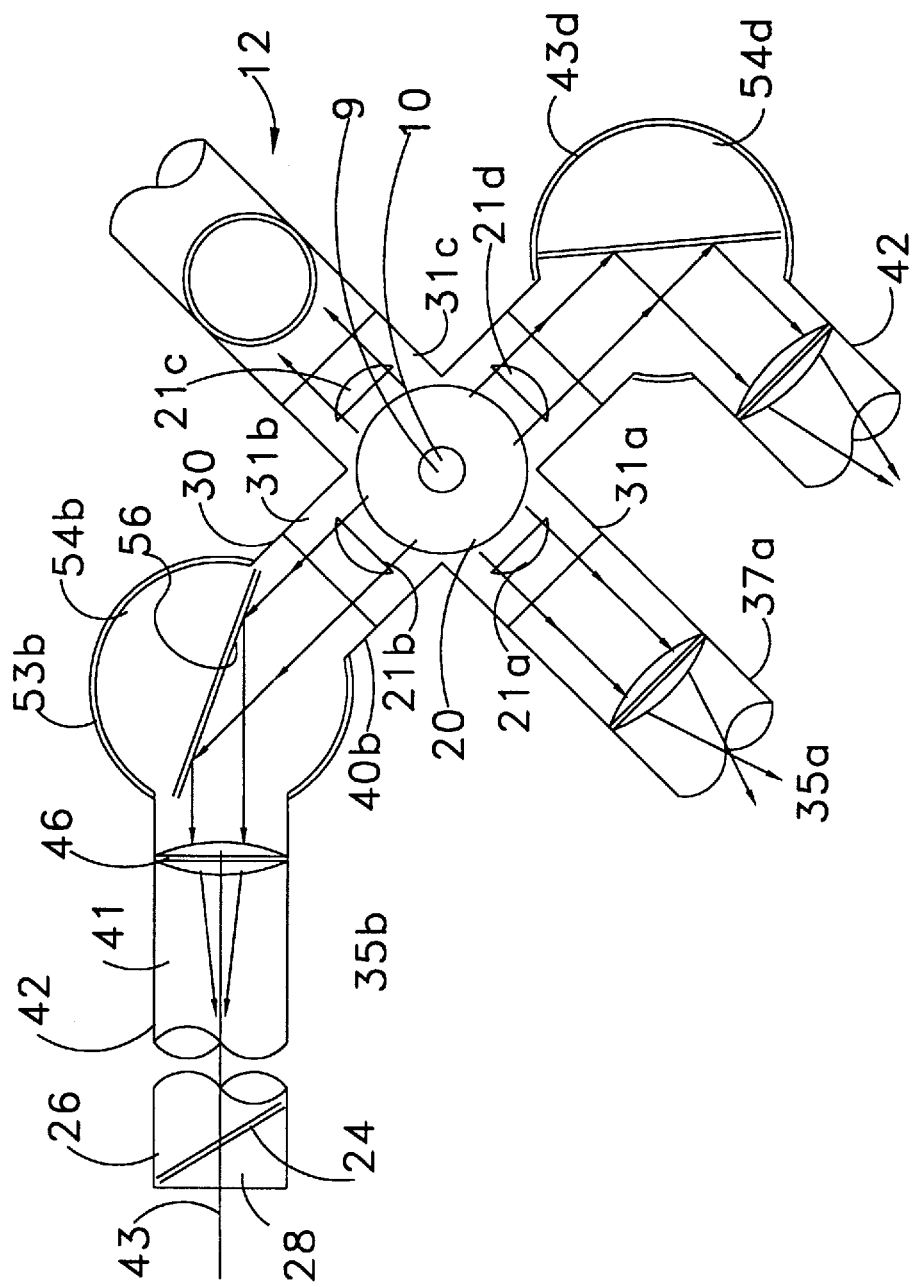
FIG. 1 is a cross sectional plan view of a system constructed in accordance with the present invention.

Referring now to a first embodiment, FIG. 1 is a cross sectional plan view of a system 1 constructed in accordance with the present invention, FIG. 2 is an axonometric illustration the coupling means containing light manipulation means, e.g. reflecting components, and FIG. 3 is a cross sectional plan view of the apparatus illustrated in FIG. 2 further illustrating means for changing the angular displacement of the manipulation means as a direct function of angular change of position of an illumination director, thereby maintaining beam continuity and integrity. In each figure, the same reference numerals are used to denote the same elements.

In FIG. 1, the dot marked 9 represents a vertical axis. Directions are arbitrary, and "vertical" is used to denote the axis 9 perpendicular to a plane 12 in which light is radially distributed. A quasi point source 20 is provided oriented on the axis 9. Light could also be directed in other planes at different angles from the plane 12. The source 20 provides light to be distributed by the system 1. The quasi point source 10, or source 10, may comprises one of many different forms, including a halogen lamp or a metal halide lamp. The source 10 is surrounded by collimation optics 20 which provide beams of collimated light in an initial radial direction for further transmission and manipulation.

In the present illustration, four collimation lenses 21a through 21d are provided because in the present embodiment, four beams are provided for direction and manipulation. Other numbers of arms could be provided. The source 10 and collimation optics 20 are mounted in a housing 30 having four perpendicular coupling arms 31a through 31d. The coupling arms 31a through 31d each provide a path 35a though 35d respectively through which light travels in an initial radial direction. In this illustration, there is a different initial radial direction for each beam. In accordance with the present invention, light in each arm will be manipulated. Arms 31a and 31c provide for coupling of the light beams further described below. In the present description, when the suffix letter is not stated, then the description applies to any component bearing that number.

The coupling arms 31b and 31d are described with respect to the embodiment of FIG. 1. An inner part of the arm 31b is comprised of a tube 40b which has a proximal end mating with the housing 30 and a conveyance means 42, here a tube 41b, having a distal end housing a directing means 24 and an exit means 26. Preferably, interiors of tubes 41, and consequently the interiors of conveyance 42 should be specular or semi-specular.

An illumination director 28 may be comprised of the directing means 24 and exit means 26. The illumination director 28 directs light beams away from the system 1 to provide illumination to selected points, lines, areas or volumes. The illumination director 28 may further include means to enlarge or reduce beams. For example, in FIGS. 1–3, the directing means 24 as illustrated may include conventional means to increase dispersion.

Respective opposite ends of the coupling arm 31 and conveyance means 42 mate respectively with first and second path ports 51 and 52 of a coupling means 53 containing reflective manipulation means 54. In the present embodiment, the conveyance means 42 is embodied by the arm 41, and will be referred here as the arm 41. The arm 41 has an axis 43 (e.g. axis 43b in FIG. 1. Secondary optics 46 may be placed in the conveyance means 42 to control beam divergence within the conveyance means 42, and also controls divergence of the beam leaving the exit means 26. By changing the focal distance of the secondary optic lens 46 may change position with respect to the exit means 26, but remains fixed with respect to the collimation optics 20. It is desirable in this embodiment that the collimation optics 20 focuses the beam narrowly, i.e. to minimize bounces within the arm 41.

The coupling means 53 couples a light beam from the source to the conveyance means 41. The manipulation means 54 comprises a reflecting mirror 56 which reflects light from the arm 31 to the arm 41, and rotates about a pivot axis 57. The reflective manipulation means 54 provides for angular displacement of the arm 41 with respect to the radial direction of the coupling arm 31 without light loss. To this end, the mirror 56 is made to rotate at half the angular rate of the arm 41 about the pivot axis 57. Since angle of incidence equals angle of refraction at the mirror 56, this function assures that the beam will remain directed along the axis of the conveyance means 42. While the particular means for rotation does not comprise part of the invention, an example is illustrated with respect to FIGS. 2 and 3.

The reflective manipulation means 54 comprises a circular housing 60 which includes the ports 51 and 52. An inner semicircular half 61 of the housing 60 containing the port 51 is mounted to rotate with respect to an outer semicircular half 62 which is fixed and subtends the port 52. An accordion portion 64 mounted between an end of the half 62 and an end of the half 61 is provided to expand to maintain closure of the housing 60 when the semicircular half 61 is moved in to overlap a portion of the half 62. The half 61 is mounted on an arm 66 to rotate about the axis 57.

The mirror 56 is supported to an arcuate portion 70 is mounted vertically above the mirror 56. A pulley 70 is fixed to the arm for rotation about the axis 57. Pulleys 73 and 74, shown only in FIG. 3, are supported along with the arcuate portion 70, and a drive belt 76 goes around the arcuate portion 70, surfaces of the pulleys 73 and 74, and around substantially the diameter of pulley 72. The pulleys 73 and 74 are proportioned such that the pulleys 71 will rotate once per revolution of pulley 72. When the arm 66 is rotated, the pulley 72 rotates and transmits force to the drive belt 76. The drive belt 76 causes the pulleys 73 and 74 to rotate and to cause angular displacement of the mirror 56. Since the length of the drive belt is selected such that two revolutions of the pulley 72 are required to produce one revolution of the arcuate portion 70, the rate of angular movement of the mirror 56 is half that of the arm 66.

In this manner beam integrity is maintained. All light from the arm 30 will be directed in the direction 15 to travel within the tube 41. Light is not cut off by edges or walls of the port 52. Consequently, efficiency is maintained. The angle of incidence of light from the tube 40 to the mirror 56 will continue to equal the angle of reflection of the light from the mirror 56 to the tube 41. Light will not be lost due to its being directed to the walls of the arm 31, but will continue to follow a path directly to the exit means 26. FIG. 3 is exemplary of a means for rotating the reflective manipulator at half the angular rate of a rotatable arm. The specific mechanism does not form a part of the present invention.

If the length of the conveyance means 42 were simply lengthened with no optical manipulation, significant light loss could occur. The collimation optics 20 focal length will not change, while the distal end of the tube 82 is moved with respect the collimation optics. Light needs to be focused such that it is directed substantially totally to the directing means 24 and the exit means 26. It is not desired to direct light to inner walls of the tubes 81 and 82, where losses may occur. The inner walls of the tubes 81 and 82 are specular to further minimize losses. The secondary optics 46 (FIG. 1) controls divergence of a light beam. In this manner, the arm 41 may be lengthened or shortened while still keeping the light beam substantially totally internally reflected to the directing means 24 and to the exit means 26.

Figure 1A:
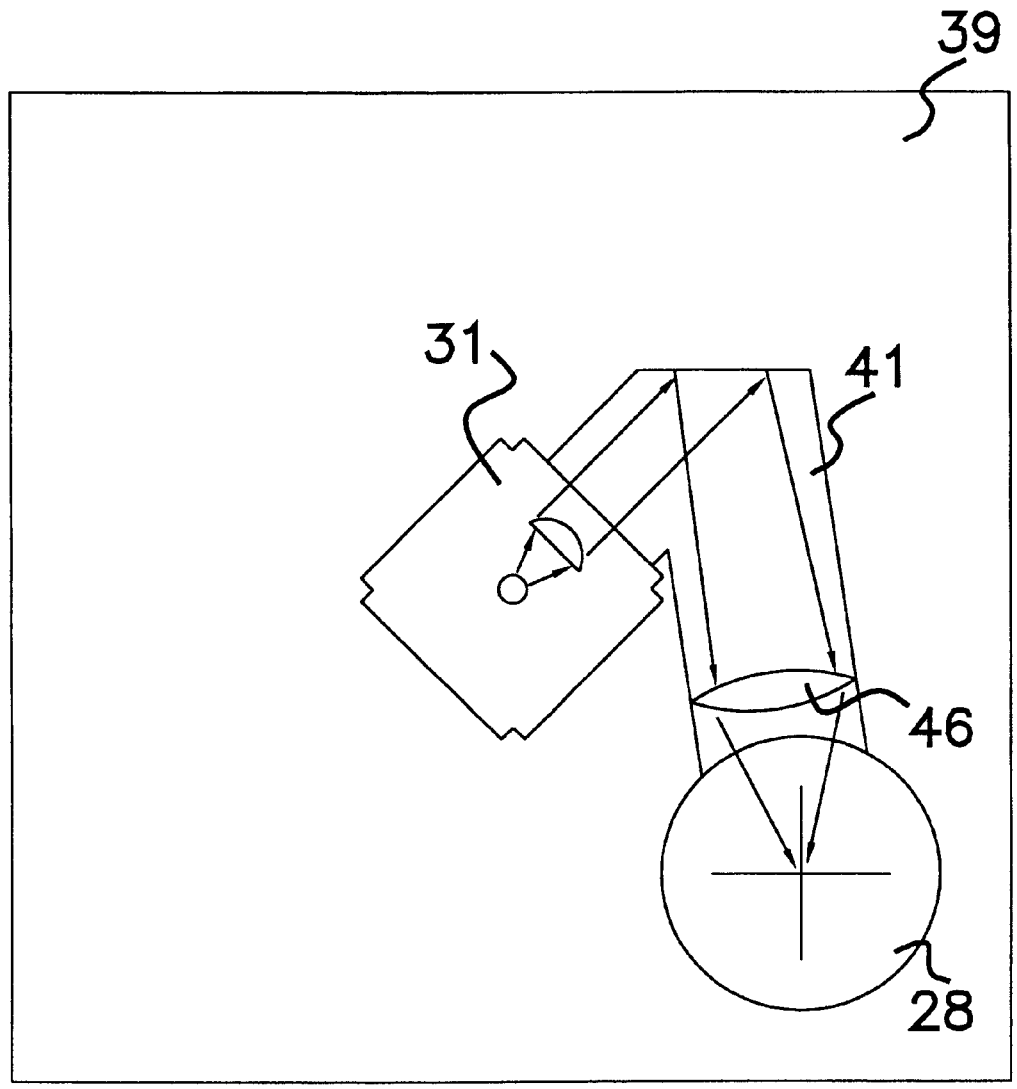
FIG. 1a illustrates a system according to FIG. 1 adapted for use in confined spaces.

FIG. 1a is a cross sectional plan view of a system 1 which is mounted within the confines of a confined planar dimension, e.g. a panel 39. An arm 41 is essentially "folded back" on itself. The axis 42 of the tube 41 forms an acute angle with respect to the tube axis of the tube 31. In this manner, a conveyance means 42 may have an increased range of possible lengths while meeting structural or other constraints satisfied by mounting the system 1 within the confines of the panel 39. The illumination director 28 is provided in an alternate form having an outer shape further described with respect to FIGS. 9 through 12. The secondary optics 46 is shown in the form illustrated in FIGS. 23 and 24.

Referring now to FIG. 5, a first light distribution system 101 and a second light distribution system 102 are each secured to the ceiling grid 95. The system 101 has two arms 141a and 141b respectively providing for beam manipulation by transmissive and reflective means. The system 102 includes an arm 143 providing both forms of manipulation in one arm. Solid lines denote a first configuration of each system 101 or 102, which comprises a position for each of the arms, and the dotted lines represent a second configuration of the systems 101 and 102. Consequently when lighting requirements change for an illuminated space, reconstruction or rewiring of a system 1 is not required. Illumination directors 128 have the outer shape described with respect to FIGS. 9 through 12 below.

Figure 6:
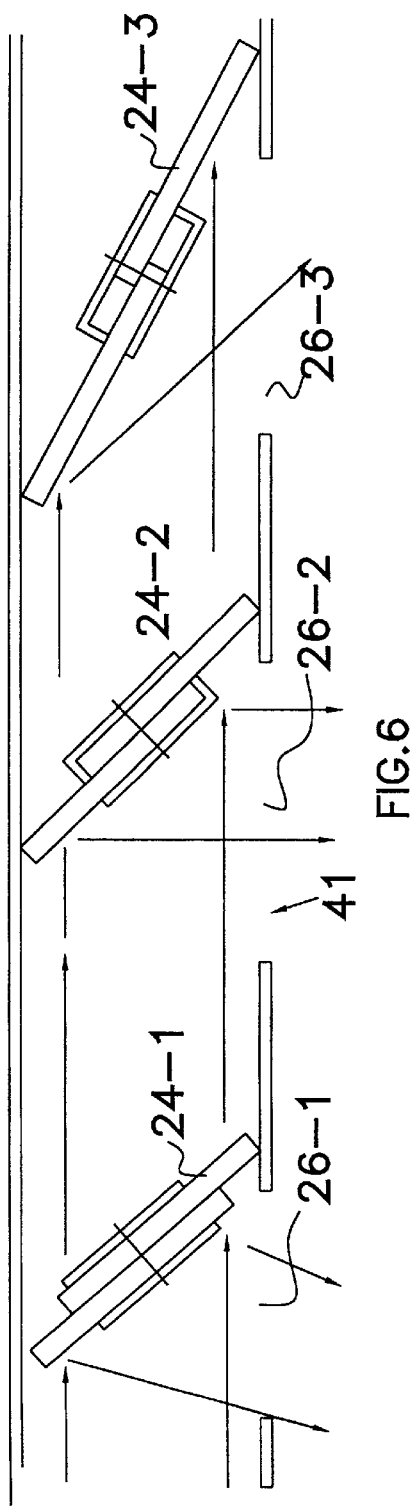
FIG. 6 is a cross sectional view of a light directing arm comprising a plurality of illumination directors.
Figure 8:
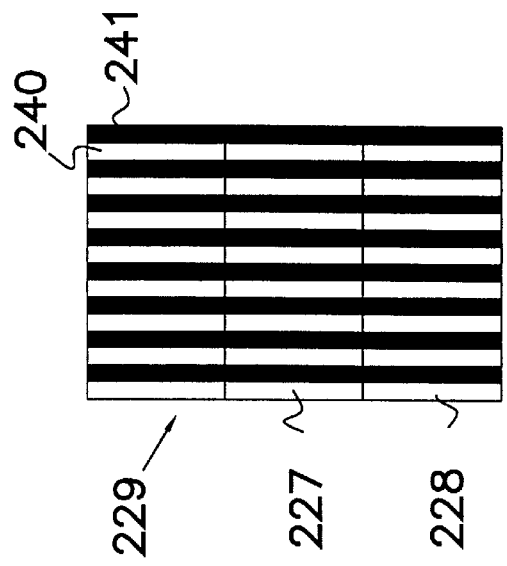
FIG. 8 is a front elevation of a beam splitting mirror useful in the embodiments of FIGS. 6 and 7.
Figures 7A, 7B:
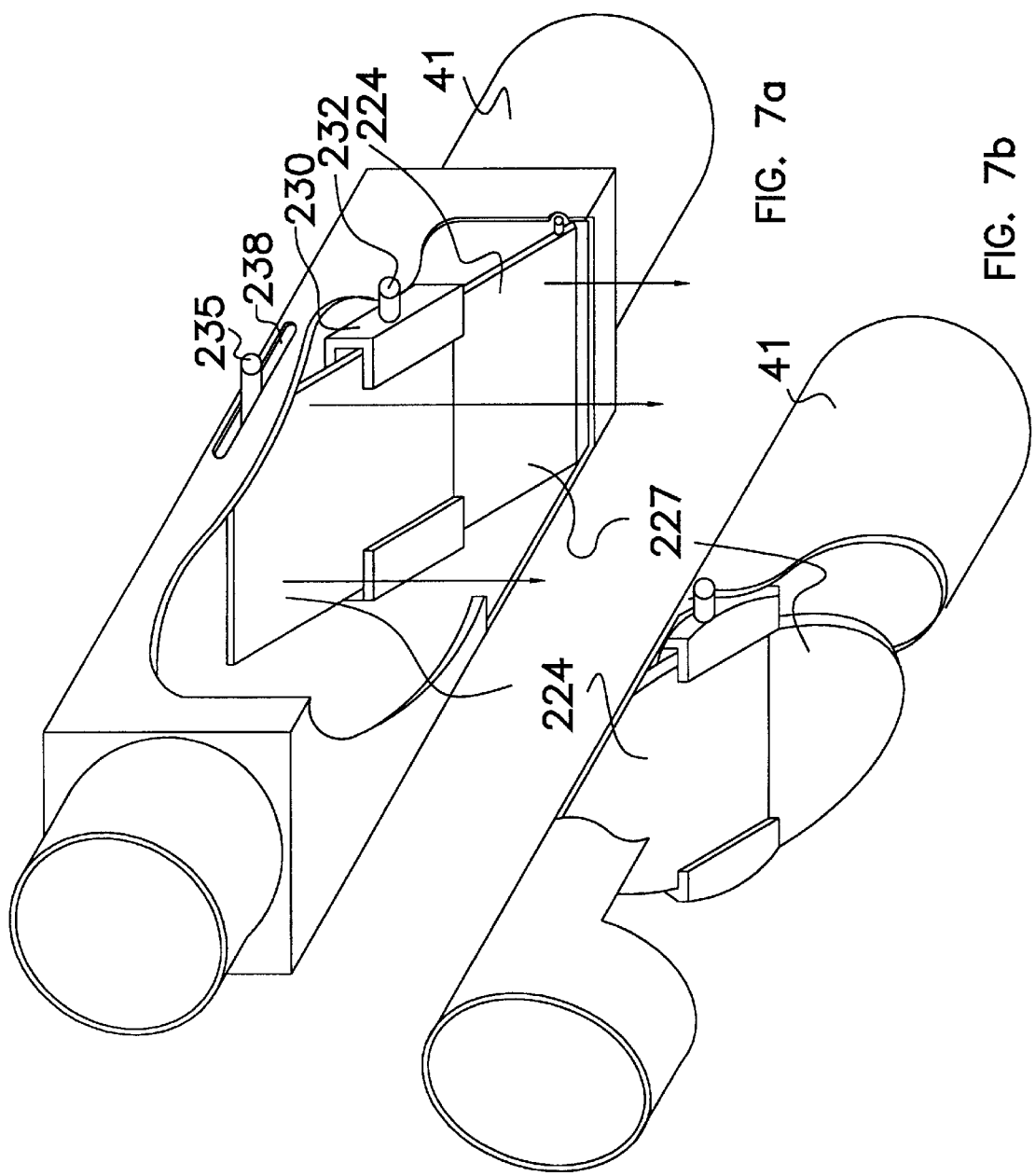
FIGS. 7a and 7b are each an axonometric view, partially broken away, showing alternative shapes of beam splitting mirrors.

FIG. 6 is a cross sectional side elevation of an arm 41 having a plurality of directing means 24 and exit means 26. FIGS. 7a and 7b are axonometric views of alternate forms of arm 31, each broken away to show alternate forms of directing means 24. FIG. 8 is a front elevation of a beam splitting mirror for use in the embodiment of FIG. 6. In FIG. 6, an arm 41 comprises directing means 24-1, 24-2 and 24-3. Each directing means comprises a beam splitting mirror 224 (FIGS. 6–8), except that a beam splitting mirror not followed by a further optical path, here mirror 224-3, is preferably not a beam splitter. It is desirable to keep the vertical height of each mirror the same so that the mirror 24 continues to fill the cross section of the arm 41 in order to intercept all light transmitted radially in the arm 41. A common angular displacement for a beam splitting mirror 224 is at 45° to the radial direction and transverse to the beam direction, as illustrated by directing means 24-2.

If a mirror of fixed dimension is used in an arm 41 of fixed cross section, it will not be possible to rotate that mirror to form a larger angle to the light beam since its vertical dimension is too great for the cross sectional area. If it is desired to decrease the angle between the mirror and the light beam, the vertical dimension of the mirror is decreased, and the mirror will no longer intercept light across the entire cross section of the arm 31. Therefore a mirror 224 is provided (FIGS. 7 and 8). Mirror 224 is disposed to direct light through exit means 226. The mirror 224 has upper and lower halves 227 and 228. The mirror 224 is mounted in guide means 230 at either side thereof. They may further overlap to provide for a decreased vertical dimension when the angle between the mirror 224 and the beam is increased. When it is desired to decrease the angle, the radial length of the mirror 224 must increase while the vertical dimension stays the same. As the mirror 224 is rotated, the mirror halves slide with respect to each other so that their degree of overlap is decreased. The guide means 230 is supported for rotation in the arm 31 to pivot means 232. As illustrated in FIG. 71, a means for rotating the mirror 224 to a selected position comprises a setting bar 235 mounted to the top of the mirror 227 through a slot 238 in the arm 31.

The beam splitting mirror 224, as seen in FIG. 8 comprises alternating clear and silver stripes 240 and 241. The stripes on the half 227 are in registration with those on the half 228. In order to select the proportion of reflection and transmission, A ratio of widths of stripes 240 to the width of stripes 241 is selected.

Figure 9:
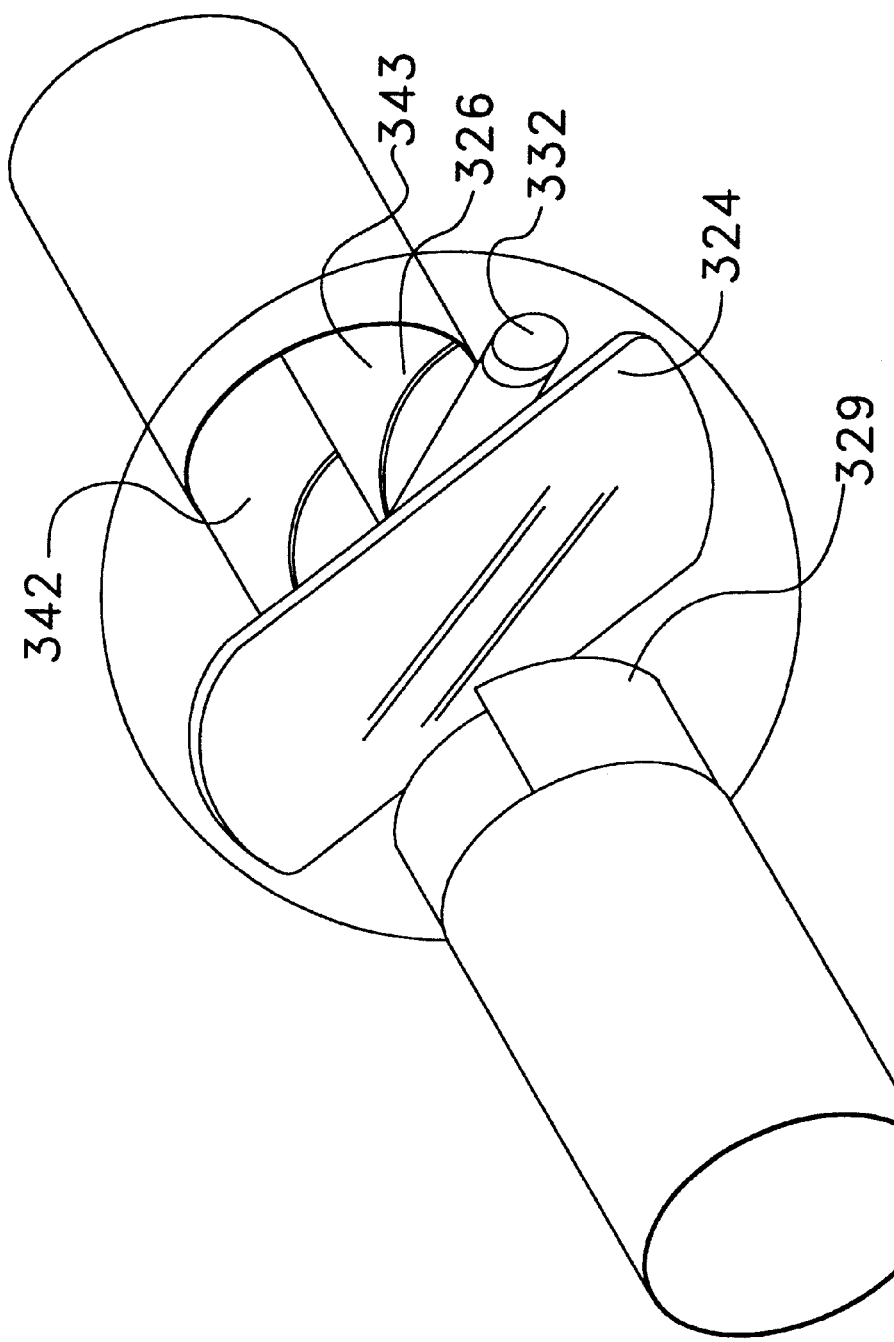
FIG. 9 is an axonometric view, partially broken away, illustrating directing means of adjustable angular displacement with respect to a beam and exit means with an adjustable aperture.

In the embodiment of FIGS. 9 through 12, a mirror 324 of fixed dimension is used to direct light through a variable exit means 326. FIG. 9 is an axonometric view, partially broken away, and FIGS. 10, 11 and 12 are each a cross sectional side elevation illustrating different angular positions the mirror 324 and may take and the corresponding positions of the exit means 26. The exit means 326 is operated to provide an aperture 329 whose width is varied on accordance with the width of the beam exiting from the arm 41 to further minimize losses. Internal surfaces are specular.

The mirror 324 is mounted in a mirror housing 329 integral with the arm 31 and having a diameter greater than arm 31 so that the mirror 324 will intercept all rays in the beam in all foreseeable operating positions.

The mirror 324 is mounted on pivot means 330, which in turn are mounted to the arm 31. The exit means 326 has the cross section of a hollow tube and comprises upper and lower slider tube halves 342 and 343. the upper half 342 is slidable in an amount which is a function of the angular displacement of the mirror 324, and the lower half 343 is also slidable in an amount which is a function of the angular displacement of the mirror 324. The upper half 342 has a slot 344 formed to permit linear motion in response to angular movement of the mirror 324. The lower half 343 has a slot 345 which widens in response to angular movement of the mirror 324, to provide an exit aperture 347.

FIGS. 10, 11 and 12 respectively illustrate the mirror 324 at angles of 30 degrees 45 degrees and 60 degrees with respect to the vertical direction. The slider tube halves 342 and 343 are each mounted to move linearly and separately. When the mirror 324 is rotated on a pivot means 332, the exit aperture 347 changes in response to angular displacement of the mirror 324. In this embodiment, surfaces of the mirror push each tube half 342 and 343 at central portions thereof. However, the mechanism itself is not part of the present invention. This change is to due to the varying juxtaposition of the slider tube halves 342 and 343 and the mirror 324. The larger the aperture 347, the more there is opportunity for light diverging from the beam in the arm 44 to escape from the exit aperture 347. By maintaining the size of the gap 347 to be no larger than that required to allow light reflected for a mirror, loss of light due to divergence is minimized.

FIG. 13 is a cross sectional elevation of means for selecting one of a plurality of light sources provided to an arm. FIGS. 13a and 13b respective illustrate first and second positions of a selecting means. FIGS. 14 and 15 are alternative means for selecting a source for inclusion in the apparatus of FIG. 13. FIGS. 16 and 17 are embodiments either which could be used in place of the embodiments of FIGS. 14 and 15 so that the apparatus of FIG. 13 will combine light from two different sources. In the embodiment of FIG. 13, the arm 31 is provided in the form of an arm 431 receiving light from a first source. The arm 431 in a nominal embodiment is at a right angle to a tube 440 receiving light from a second source. An outer tube 441 receives light to be conveyed to exit means 26. The source for tube 440 may be the sun, for example, or may be artificial.

Mirrors 426 is positioned to be rotatable around an axis 443, which is at an intersection of the optical paths of the tubes 440 and 431. In a first position, as shown in FIG. 13a, the mirror 426 is oriented in a first position at an angular displacement of 90° to the tube 440 and at 0° to directed light beams from the source 10 (not shown) along the tube 431. In a second position, as shown with respect to FIG. 13b, the mirror 426 is positioned at an angle of 45° to reflect all light from the tube 440 toward the arm 441. In this configuration, light from the tube 440 will be transmitted to the tube 441.

In the position illustrated in FIG. 14, the mirror 426 is rotated to the second position. Therefore it will reflect light from the tube 440. and block light from the tube 431. Alternatively, as shown in FIG. 15, a slot 428 is provided in the arm 431 in registration with the tube 440. A removable mirror has a first position in the slot 428 to reflect light form the tube 440 and block light reflected form the tube 431. In a second position, the mirror 427 is removed from the slot 428. Light from the tube 440 is not reflected, and light from the tube 431 is transmitted. Beam integrity and continuity are maintained. The divergence is not increased (within the limits of component precision).

In FIGS. 16 and 17, means for combining light from two sources are provided. In these embodiments, a reflecting mirror 426 need not be provided as in the embodiments of FIGS. 13–15. Means for combining light 455 are provided. The means for combining comprise a reflector 458 having an aperture 459 therein. Condensing optics 465 is placed in an arm 440-1 to image the beam traveling in the arm 440-1 on the reflector 458. The arm 440-1 may comprise, for example, the arm 440 of FIG. 13 or it may have another collimated source. A condensing means 467 is positioned in an arm 440-2 so that its focal point is in registration with the aperture 459. The arm 440-2, may comprise, for example, the arm 440 of FIG. 13. Consequently light from the tube 440-2 is also transmitted to the tube 441. In the embodiment of FIG. 16, the combining means 455 comprises a plane reflector, and the condensing means 467 is positioned in the tube 440-2 so that its focal point is at the center of aperture 459. In the embodiment of FIG. 17, combining means 455 comprises a concave reflector. The condensing means 467 is placed to image light to pass through the aperture 459 so that a diameter of a cone of focused light equals the diameter of the aperture 459. The focal point of condensing means 467 is placed at a position such that dispersion of both transmitted beams is equalized. Note that in FIG. 17, a condensing lens 467 is not provided. In this embodiment, the tube 410-1 receives sunlight, which is inherently collimated.

Figure 19:
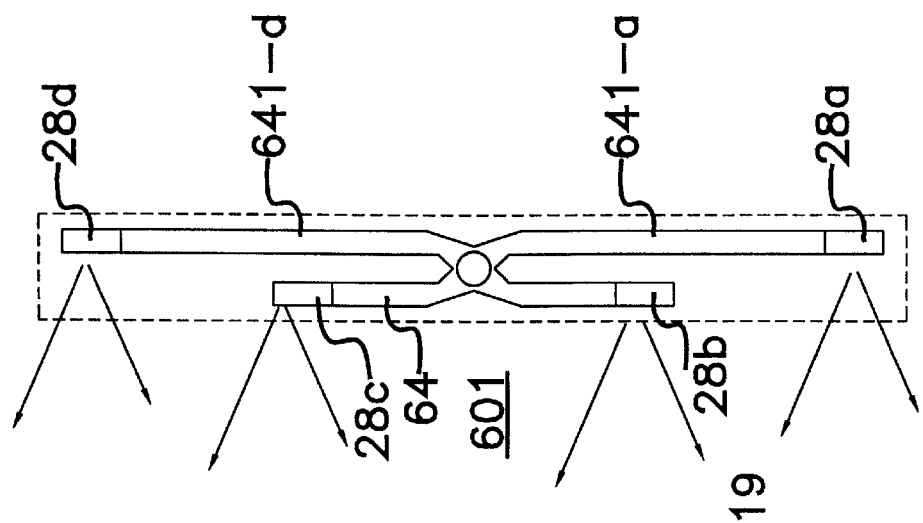
FIGS. 18 and 19 are respectively an axonometric view partially broken away and a plan view of a system for providing parallel arms.
Figure 18:
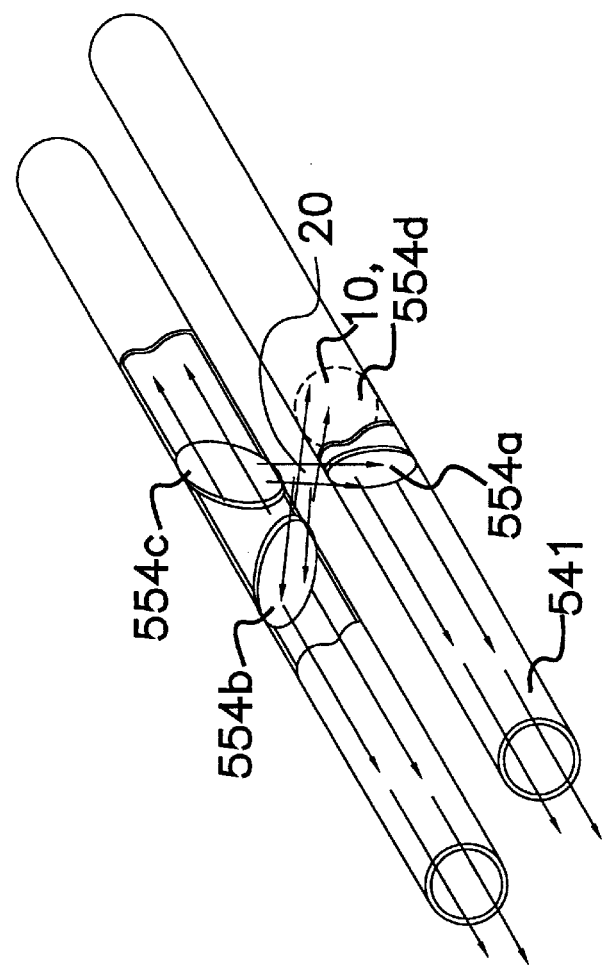

FIGS. 18 and 19 are respectively an axonometric view partially broken away and a plan view of a system for providing parallel conveyance means. Optically, the systems of FIGS. 18 and 19 are the same. However, conveyance means 541 in FIG. 18 comprises a hollow tube, while the conveyance means 641 in FIG. 19 is solid. A source 10 provides separate, radially directed beams by use of the collimation optics 20. Reflective path modifiers comprising mirrors 554 a–d direct beams in opposite direction in the radial plane in first and second parallel paths. The exit means 26 a–d as shown in FIG. 19 are arranged to deliver light beams in a preselected pattern. In this particular embodiment, all four exit means 26 face in the same direction and cooperate to provide an illumination pattern of overlapping beams. This embodiment too relates to adjustable systems. In the embodiment of FIG. 19, a system 601 has been adjusted to a configuration in which illumination directors 28 are placed on opposite ends respectively of separate conveyance means 641-1 though 641-4, two conveyance means 41 each lying on one of two separate parallel lines. This adjustment was then embodied in solid transmission means.

Figure 19A:
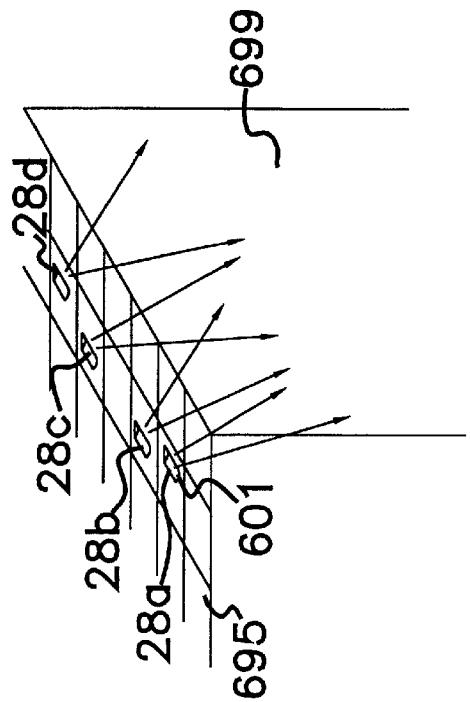
FIG. 19a illustrates a system according to the present invention used in an application to replace track light and in which a new lighting standard defines the application.

FIG. 19a is an axonometric view of the system 601 of FIG. 18 installed in a ceiling grid 695 in an application requiring illumination of areas on a vertically disposed wall 699. The present invention provides for definition of new lighting standards to traditional applications. In the present case, a traditional wall illumination means from a ceiling mounted system has been track lighting. The lighting standard for track light for this application has been one ceiling mounted track holding a plurality of spotlights, with the track being parallel to the wall at a distance of two feet. Here, the present system allows for development of new standards for the many applications that can be provided from a system having an adjustable configuration.

Figure 20:
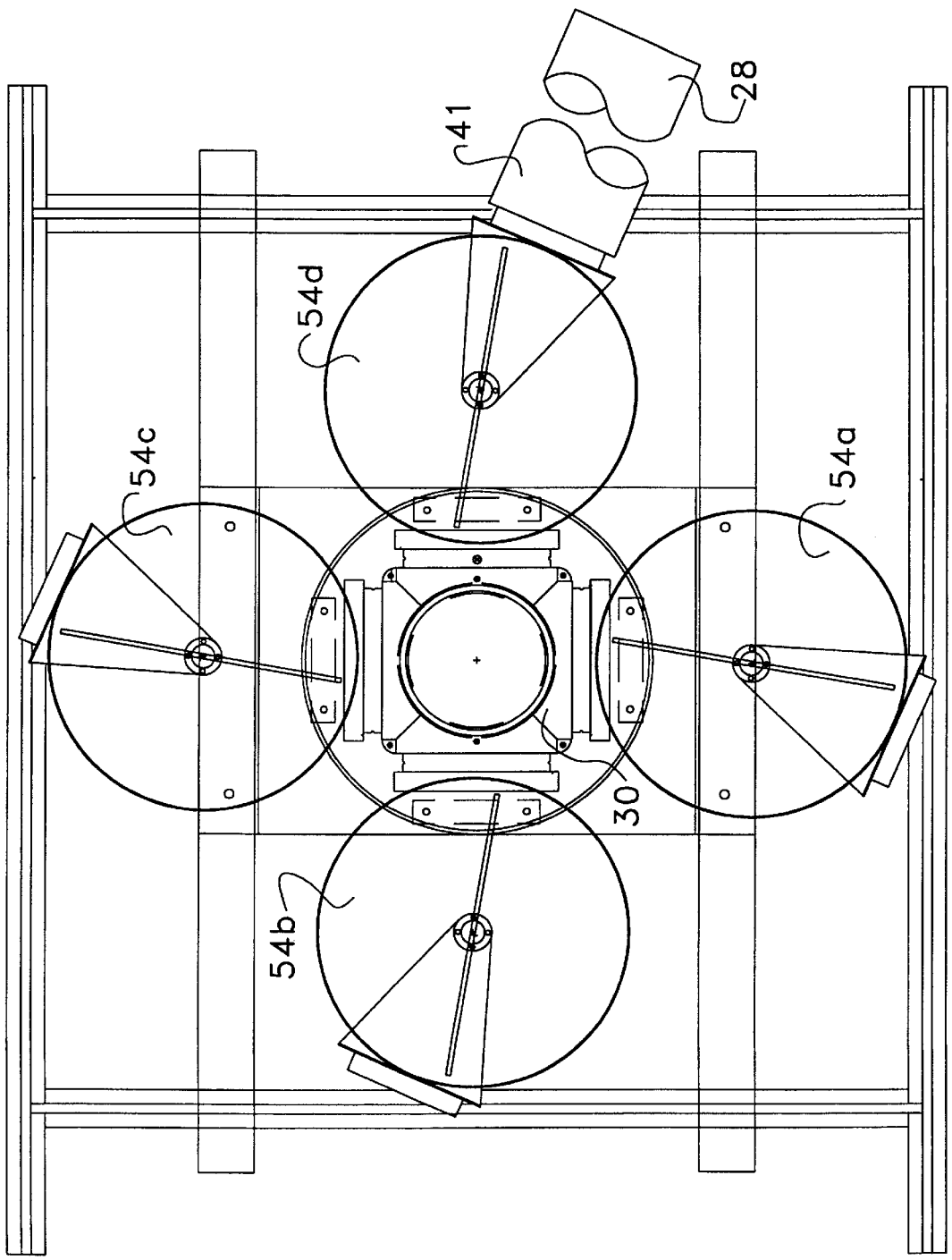
FIG. 20 is an example of manipulators 54 useful in the embodiment of FIG. 5.

FIG. 20 is plan view exemplifying of manipulators 54 useful in the embodiment of FIG. 5. Manipulators 54a–54d are mounted to cooperate with the housing means 30 and supported to the grid 95 comprising a plurality of cross members 96. Each manipulator 54 is independently adjustable. Also, the system 1 can be moved from one position on the grid 95 to another position, thus providing further versatility in reconfiguring illumination patterns provided by the system 1.

Figure 21:
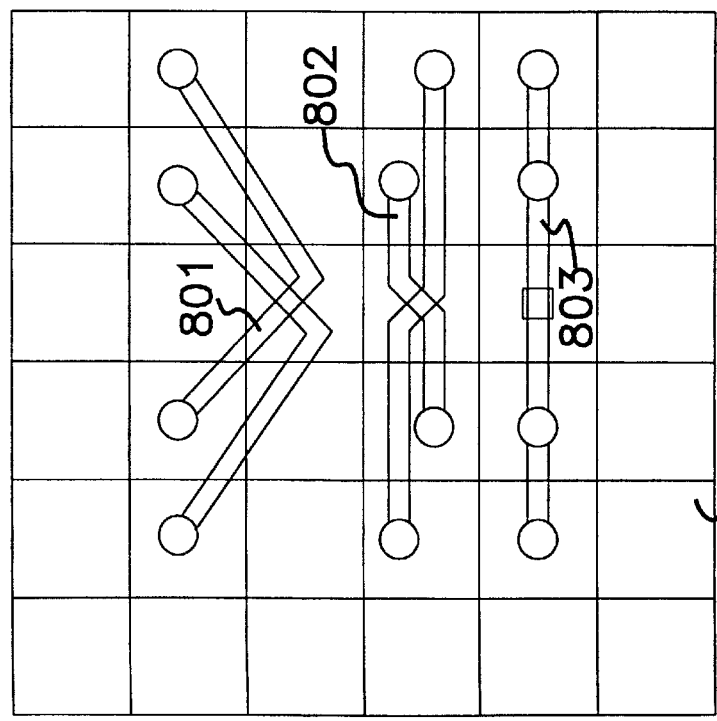
FIG. 21 is a bottom plan view of a plurality of systems included in a ceiling grid.

FIG. 21 is a bottom plan view of a ceiling in which a plurality of systems 801, 802 and 803 are each mounted to a ceiling grid 895 defining a ceiling surface 896. The system 801, 802 and 803 each respectively provide configurations in which arms 841 may be mounted at angles with respect to each other, in which arms 41 lie on two parallel lines, and in which multiple exit means are provided on a single line. It should be noted that "grid" as used herein refers to a framework. The grid members are not required to be orthogonal, nor must they all be within a plane. However, in many typical applications, grid members will be orthogonal and coplanar.

Figure 22:
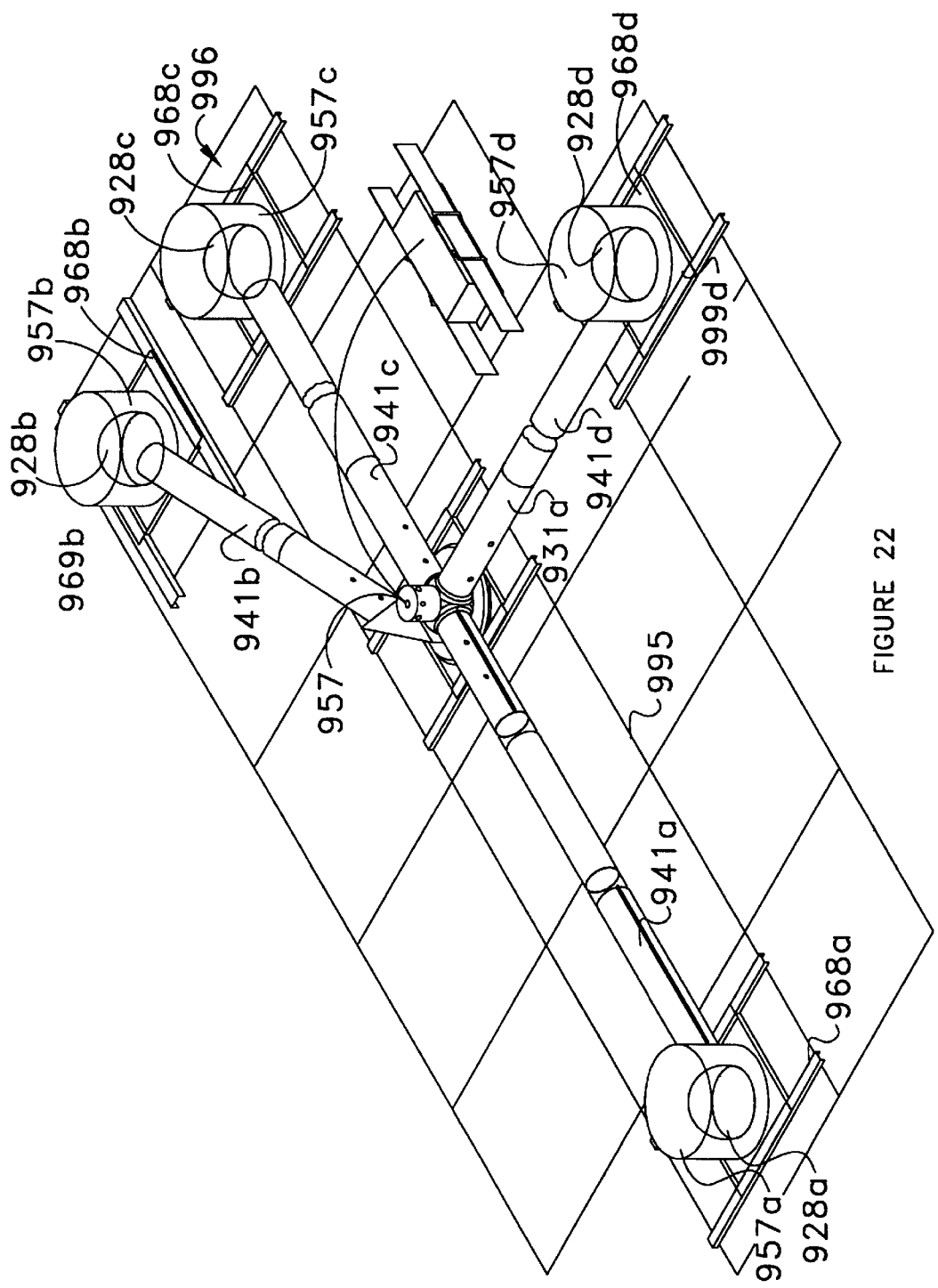
FIG. 22 is a top elevation of a light distribution system mounted to an architectural member, more specifically an architectural surface, by means comprising an optical bench.

FIG. 22 is a top elevation of a light distribution system mounted to an architectural member, more specifically an architectural surface, by means comprising an optical bench. Normally, architectural light distribution systems are viewed as manufactured products, often having the usual tolerances associated with interior construction. Lighting systems are not generally viewed as working tools and are not generally constructable in a manner that is cost-justifiable while highly precise. In the present embodiment, a light distribution system 901 is supported to a ceiling 966 which may further comprise a grid 995. Components in FIG. 22 having a 900 prefix to denote components corresponding to those similarly numbered components in the embodiments of FIGS. 1 through 3. Disclosure above regarding corresponding components applies to those of this embodiment as well.

In this view, a ballast 8 is visible and which is connected to the source 10 in a conventional manner. A housing 930 distributes light to a plurality of arms 941, in this embodiment, arms 941a–d. The arms 941 may be constructed as described with respect to FIG. 4. Additionally, a manipulating means 954b mechanically coupled between arm 941b arm 931 of the housing 930. For purposes of the present description, the arms 941b and 941d are shown as being adjustable. An illumination director 928 is located at a distal end of each arm 941. In this embodiment, the illumination director 928 is housed in a shell 957. The shell 957 protects each illumination director 928 from any deposits commonly occurring when a system is housed in an architectural context. Optical bench mounting means are provided for supporting the system 901 to either the ceiling 966 or the ceiling 955 as mounted in the ceiling 966.

Many forms of allowing for change of configuration of the system 901 by means of the optical bench mounting means. Here, pairs of parallel rails 968 each support a platform 969. The disposition of the rails 968 determine the direction in which the platform 969 may move. Each platform 969 has mounted thereto a shell 957. In this embodiment, the arm 941 is mounted for rotational movement about axis 957 of the manipulation means 954. Also, the rails 968b further allow for translation of the shell 957b and illumination director 928 in a direction at an angle to the axis 943b of the arm 941b. The arm 941b also telescopes in response to movement of the illumination director 928b. In the case of the arm 941d, the rails 968d are mounted substantially parallel to the axis 943d of arm 941d. Therefore, lineal movement of the illumination director 928d is permitted along the axis 943d. The arm 941d telescopes as described with respect to FIG. 4.

Of course, apertures 999 in the ceiling 996 must be provided to permit exiting of light from the system 901. For purposes of illustration, aperture 999d is shown greatly exaggerated in diameter so as not to be blocked from view by the shell 957. The operation of components of the elements of the system 901 as elements on optical bench permits imaginative use of the light distribution system 901. In general, mounting of a light distribution system to an architectural structure by optical bench means provides for greater flexibility than by simply manufacturing an architectural member.

In FIGS. 23 and 24, reference numerals having the prefix "10" are utilized to denote components corresponding to those similarly numbered components in the embodiments of FIGS. 1 through 3. FIG. 23 is a cross sectional elevation of one arm 1041 of a system 1001 in which beam cross section and divergence from the condensing means 1021 is repeatedly reflected to the end of the conveyance means so that the beam divergence characteristics are substantially the same at the end of a portion 1049 of the conveyance means 1042 having a constant diameter as they are when first leaving the collimation means. The remainder of the arm 1041 is of a dimension to receive secondary optics 1046, which has a greater diameter than the portion 1049. In this manner, the secondary optics 1046 will capture all light from the portion 1049. This construction maximizes efficiency and beam cross sectional integrity. Secondary optics 1046 focuses, i.e. is at a focal distance from, the aperture. Therefore, secondary optics 1046 projects a beam in the shape of the aperture 1044. The manipulation here comprises placing a lens to focus on the aperture 1044 so that significant light losses do not occur between the aperture 1044 and and the illumination distributor 1028.

The aperture 1044 may further comprise an image gate 1045. This is accomplished by placing in the aperture a stencil, film image. The image in the image gate 1045 will then be projected by the secondary optics 1046. When the secondary optics 1046 is focused on the aperture 1044, a hard edge beam may be provided. A hard edge beam is of substantially uniform brightness across the beam, with a sharp cut off at its edge.

FIG. 24 is a cross sectional elevation of an embodiment similar to that of FIG. 23, but in which tertiary optics 1048 are provided. The tertiary optics 1048 are mounted in a telescoping portion 1050 at the end of the constant cross section part 1049 of the conveyance means 1041. By altering the distance between the tertiary optics 1048 and the secondary optics 1046, the divergence of the beam leaving the secondary optics 1046 changes. This allows for selectability in divergence of the beam pattern.

The embodiments of FIGS. 23 and 24 are each useful as a component for allowing for selectable degree of remoteness of an illumination director from a quasi point source in a light distribution system. Either embodiment could be included in an architectural member or grid of architectural members such as those of my above cited U.S. Pat. No. 5,130,908.

The foregoing has been written to enable those skilled in the art to produce many forms of the invention in addition to those specific embodiments disclosed here. Many variations comprehended by the present invention will suggest themselves to those skilled in the art.

What is claimed as new and desired to be secured by Letters Patent of the United States is:

1. An adjustable light distribution system for directing light beams remote from a quasi point source comprising:

collimation means for surrounding a quasi point source;

conveyance means including collimation optics;

at least one illumination director;

said collimation means directing light beams therefrom to said conveyance means and to an illumination director movable with said conveyance means, said conveyance means providing a path of travel along an axis thereof from said collimation optics to said illumination director, each said illumination director directing a beam away from said system to provide illumination, and further comprising coupling means coupling a beam between said collimation means and said conveyance means, a set of spatial relationships each said illumination director defining a first configuration, said system being adjustable to a second configuration wherein at least one said illumination director is moved to a different position, and manipulation means in the path of said conveyance means corresponding to said at least one illumination detector, said manipulation means manipulating the beam for preserving continuity and integrity of the beam therethrough, whereby light loss due to change in configuration is minimized.

2. The system of claim 1 in which adjustment of the system is accomplished by angular displacement of said conveyance means, said coupling means includes said manipulation means and said manipulation means includes means to maintain the beam on the axis of said conveyance means.

3. The system of claim 2 in which said means to maintain the beam on the axis comprises reflecting means.

4. The system of claim 3 in which said manipulation means comprises means to rotate said reflecting mirror in response to and at one half the rate of angular displacement of said conveyance means.

5. The system of claim 3 in which adjustment of said system further comprises linear motion of said at least one illumination director and lengthening of said conveyance means, and said manipulation means comprises secondary optics in said conveyance means for controlling beam divergence.

6. The light distribution system of claim 3 wherein system is adapted to be confined within an area and said reflecting mirror is positioned to reflect the beam at an acute angle, whereby the conveyance means may be folded back upon itself to provide for maximized conveyance means length for the area.

7. The system of claim 1 in which adjustment of said system comprises translation of said at least one illumination director and lengthening of said conveyance means, and manipulation means comprises secondary optics in said conveyance means for controlling beam divergence.

8. The system of claim 1 further wherein said reflecting means are selected to have greater cross sectional areas than said conveyance means such that cutoff of the beam is prevented.

9. The system of claim 8 in which said adjustment of said system further comprises angular displacement of said conveyance means, said coupling means includes said manipulation means, and said manipulation means includes means to maintain the beam on the axis of said conveyance means.

10. The system of claim 1 comprising means providing at least an illumination director and means for mounting each said illumination director to a ceiling.

11. The system of claim 10 wherein a plurality of illumination directors are provided and in which illumination directors are located along separate parallel conveyance means.

12. The system of claim 10 for replacing track lighting in which each said illumination detector is positioned to illuminate a wall.

13. The system of claim 12 wherein said illumination directors are arranged to define a lighting standard different from conventional track lighting standards.

14. The system according to claim 10 wherein said means for mounting comprises a grid.

15. The system according to claim 14 wherein said means for mounting further comprises optical bench mounting means between said grid and each said illumination director.

16. The system according to claim 1 wherein said conveyance means includes a plurality of directing means which include successive reflectors, each reflector which is followed by a successive stage comprising a beam splitting mirror.

17. The system according to claim 1 in which said directing means comprises a split mirror, one half being slidable over the other, said halves being substantially overlapping when said split mirror is substantially normal to the axis of said conveyance means, and said mirrors increasing in axial length while having substantially the same vertical length with changing angular displacement, whereby the transverse dimension of the directing means is minimized.

18. The light distribution system of claim 1 wherein said manipulation means comprises an image aperture and secondary optics, said secondary optics located for focusing on said image aperture for projecting an image from said arm.

19. The system of claim 1, wherein said coupling means includes reflecting means mounted for selected angular displacement with respect to an initial radial direction, said reflecting means having a greater dimension in a plane normal to the radial direction than a corresponding dimension of a cross sectional area of said beam, whereby cutoff of the beam is prevented as a function of increased angular displacement of the reflecting means.

20. The system of claim 1, wherein said conveyance means includes a plurality of directing means displaced along a same radial axis, each directing means comprising a mirror, and further wherein each mirror which is followed along the axis is a beam splitting mirror, at least one of said directing means being rotatable, and having first and second slidable overlapping halves so that the vertical dimension of the mirrors may be constant in response to angular displacement of the mirror while radial length changes, a first half of each said pair of overlapping halves having silvered stripes in registration with the corresponding second half of the pair.

21. The system of claim 1 further comprising an exit means comprising movable members surrounding an exit aperture, said members being moveable to increase a dimension of an aperture defined by in response to increasing dimension of the beam being directed therefrom.

22. The system of claim 21 wherein the directing means comprise a mirror rotatably mounted to change beam direction as a function of angular displacement of the mirror and wherein the movable members comprise upper and lower specular tube sections, and forward and back halves in the radial direction, and means for moving said front and rear portions of said upper and lower tube halves to increase the defined aperture in response to increasing angular displacement of said mirror with respect to the beam, said lower tube half being adjacent said exit aperture with its front and rear portions separating at a greater rate than those of said upper tube half.

23. The system of claim 1, further comprising beam combining means including a reflector for reflecting a beam at an angle thereto and an aperture therein for permitted transmission of a beam from a rear side to combine with the reflected beam, secondary collimation optics for directing a beam through said aperture and providing beam divergence of the transmitted beam equal to the reflected beam.

24. An adjustable light distribution system for directing collimated light beams remote from a quasi point source and collimation optics comprising: a plurality of conveyance means and an illumination director for a beam receiving a beam from one conveyance means, each said conveyance means for providing a path of travel along an axis thereof from collimation optics to said illumination director, each said illumination director directing a beam away from said system to provide illumination, a set of spatial relationships of at least one said illumination director defining a position in a first configuration, at least one of illumination directors being movable to a different position in comparison to said position in the first configuration to define a second configuration, and means for mounting each said illumination director to a support surface, said means for mounting further comprises optical bench mounting means between said support surface and each said illumination director.

25. The system of claim 24 further comprising grid means intermediate said support surface and optical bench mounting means.

26. An adjustable light distribution arm for directing collimated light beams remote from a quasi point source comprising conveyance means and an illumination director for a beam, said conveyance means for providing a path of travel for a beam along an axis thereof, each said illumination director directing a beam away from said system to provide illumination, a set of spatial relationships of at least one said illumination director defining a first position in a first configuration, at least one of illumination directors being movable to a different position in comparison to said first position in the first configuration to define a second configuration, said conveyance means comprising manipulation means for maintaining beam integrity and continuity in the conveyance means, said manipulation means including an image aperture and secondary optics, said secondary optics located for focusing on said image aperture for projecting an image from said arm.

27. An adjustable light distribution system for directing a light beam remote from a quasi point source comprising: collimation means for producing a collimated beam and for directing the light beam therefrom to a conveyance means, and to an illumination director movable with said conveyance means, said conveyance means providing a path of travel along an axis thereof from collimation optics to said illumination director, said illumination director directing a beam away from said system to provide illumination, and further comprising coupling means coupling a beam between said collimation means and said conveyance means, each said illumination director having a first position with respect to said quasi point source which provides for continuity and integrity of the beam, said illumination director being at a selected position with respect to the first position, and manipulation means in the beam path, said manipulation means manipulating the beam for preserving continuity and integrity of the beam therethrough, whereby light loss due to change in position of the illumination director is minimized.

28. The system of claim 27 in which change of position of said illumination director comprises angular displacement of said conveyance means and said manipulation means comprises means to maintain the beam on the axis of said conveyance means.

29. The system of claim 28 in which said means to maintain the beam on the axis comprises a reflecting mirror.

30. The system of claim 27 in which adjustment of said system comprises translation of said at least one illumination director and lengthening of said conveyance means, and manipulation means comprises secondary optics in said conveyance means for controlling beam divergence.

31. The system of claim 29 in which adjustment of said system comprises translation of said at least one illumination director and lengthening of said conveyance means, and manipulation means comprises secondary optics in said conveyance means for controlling beam divergence.

32. An adjustable light distribution arm for directing collimated light beams remote from a quasi point source comprising conveyance means and an illumination director for a beam, said conveyance means for providing a path of travel for a beam along an axis thereof, each of said illumination directors directing a beam away from said system to provide illumination, a set of special relationships of at least one said illumination directors being movable to a different position in comparison to its position in the first configuration to define a second configuration, said conveyance means comprising manipulation means for maintaining beam integrity and continuity; wherein said manipulation means comprises a reflecting mirror is positioned to reflect the beam at an acute angle, whereby the arm may be folded back upon itself to provide for maximized arm length for a given area.

* * * * *